United States Patent [19]

Beemer et al.

[11] Patent Number: 4,548,303
[45] Date of Patent: Oct. 22, 1985

[54] COMPOSITE DRIVE FOR A TRACTOR INCLUDING A FLUID COUPLING ASSEMBLY WITH A LOCKUP CLUTCH

[75] Inventors: Richard B. Beemer, Lombard; Richard G. Hennessey, Oak Lawn; Harold W. Melles, Downers Grove, all of Ill.

[73] Assignee: J. I. Case Company, Racine, Wis.

[21] Appl. No.: 470,036

[22] Filed: Feb. 28, 1983

Related U.S. Application Data

[63] Continuation-in-part of Ser. No. 423,893, Sep. 27, 1982, Pat. No. 4,526,255, which is a continuation-in-part of Ser. No. 240,040, Mar. 3, 1981, abandoned.

[51] Int. Cl.³ .............................................. B60K 41/22
[52] U.S. Cl. .................................... 192/3.31; 192/3.58
[58] Field of Search .................... 192/3.28, 3.29, 3.31, 192/3.32, 3.33, 3.57, 3.58, 87.18, 87.14, 87.12; 74/645, 731, 732, 745, 733, 15.84

[56] References Cited

U.S. PATENT DOCUMENTS

| 2,970,482 | 2/1961 | Strehlow et al. | 74/15.84 |
| 3,390,594 | 7/1968 | Gillespie | 74/732 |
| 3,442,346 | 5/1969 | Winter et al. | 74/745 X |
| 3,805,640 | 4/1974 | Schneider et al. | 74/645 |
| 3,861,241 | 1/1975 | Hancock | 74/733 |
| 4,027,554 | 6/1977 | Ito | 192/3.58 X |
| 4,373,619 | 2/1983 | Schritt et al. | 192/3.28 X |

FOREIGN PATENT DOCUMENTS 2033032 5/1980 United Kingdom.

Primary Examiner—George H. Krizmanich
Attorney, Agent, or Firm—Dressler, Goldsmith, Shore, Sutker & Milnamow, Ltd.

[57] ABSTRACT

A transmission system for transmitting power from an engine to the driving wheels of a tractor. The system includes a multiple ratio mechanical range transmission coupled to a speed transmission via a manually operable master clutch. A high slip fluid coupling is used to couple the speed transmission to the engine. The coupling includes a lockup clutch engageable and disengageable under predetermined conditions and sequential order with other clutches.

9 Claims, 3 Drawing Figures

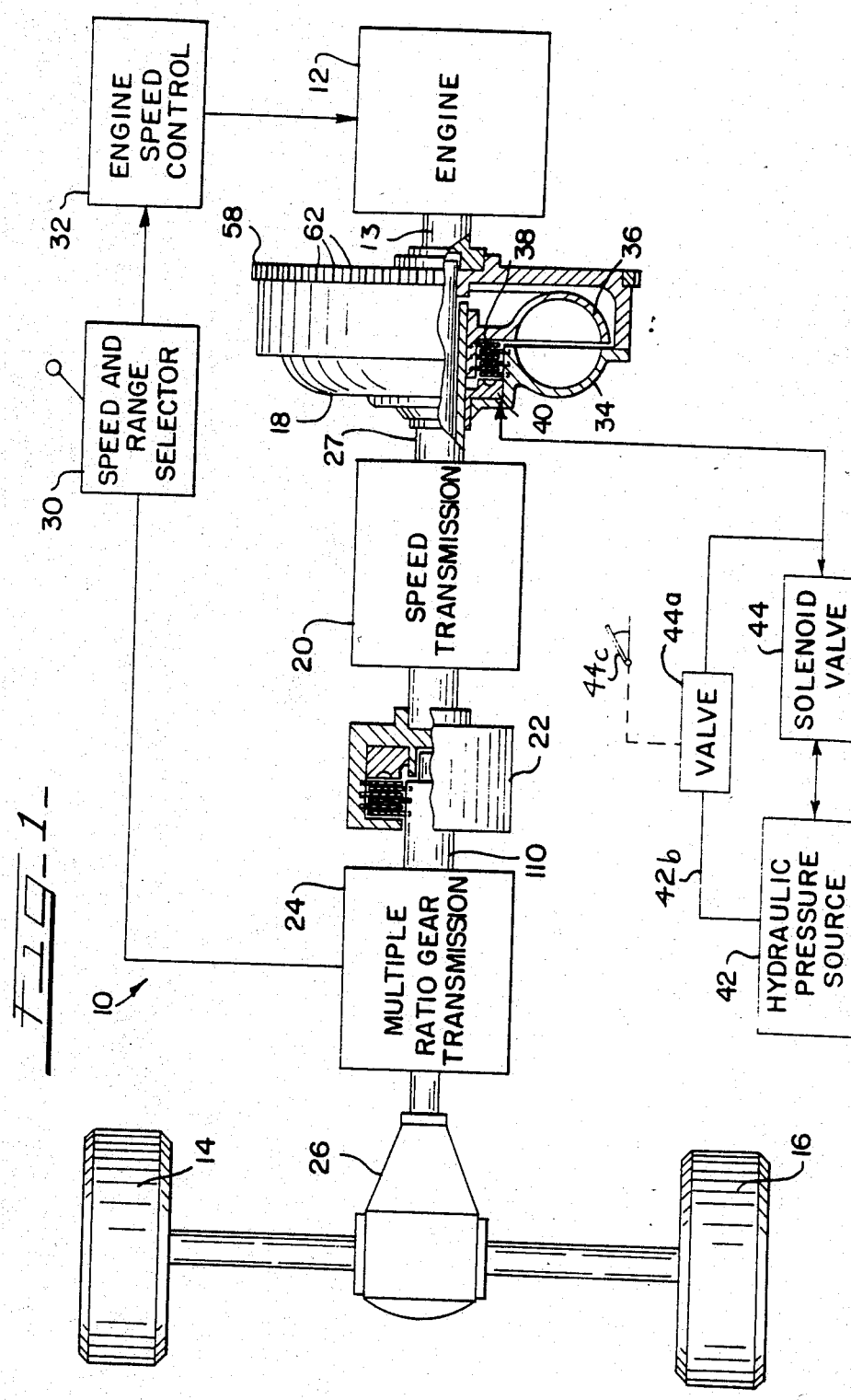

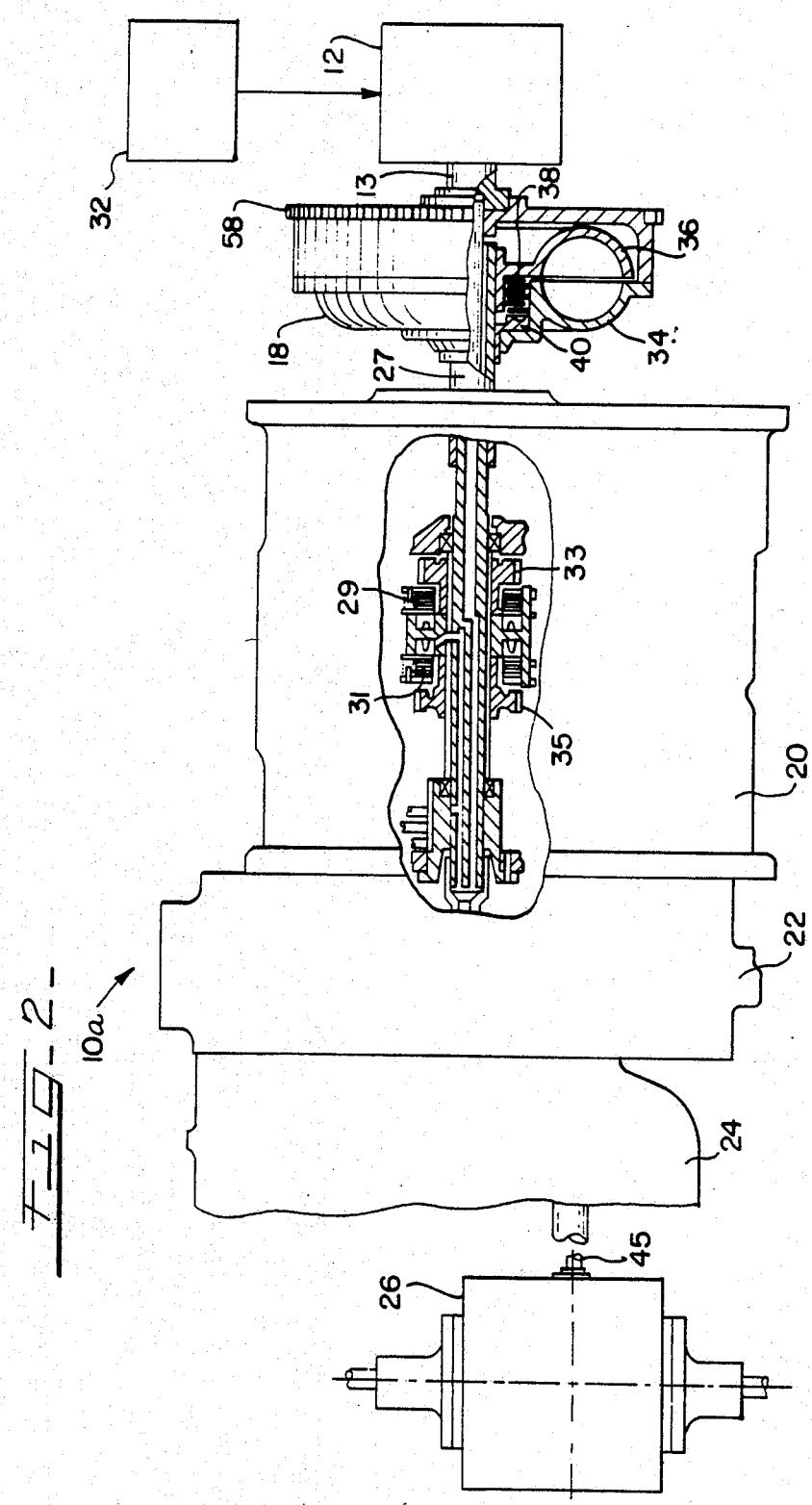

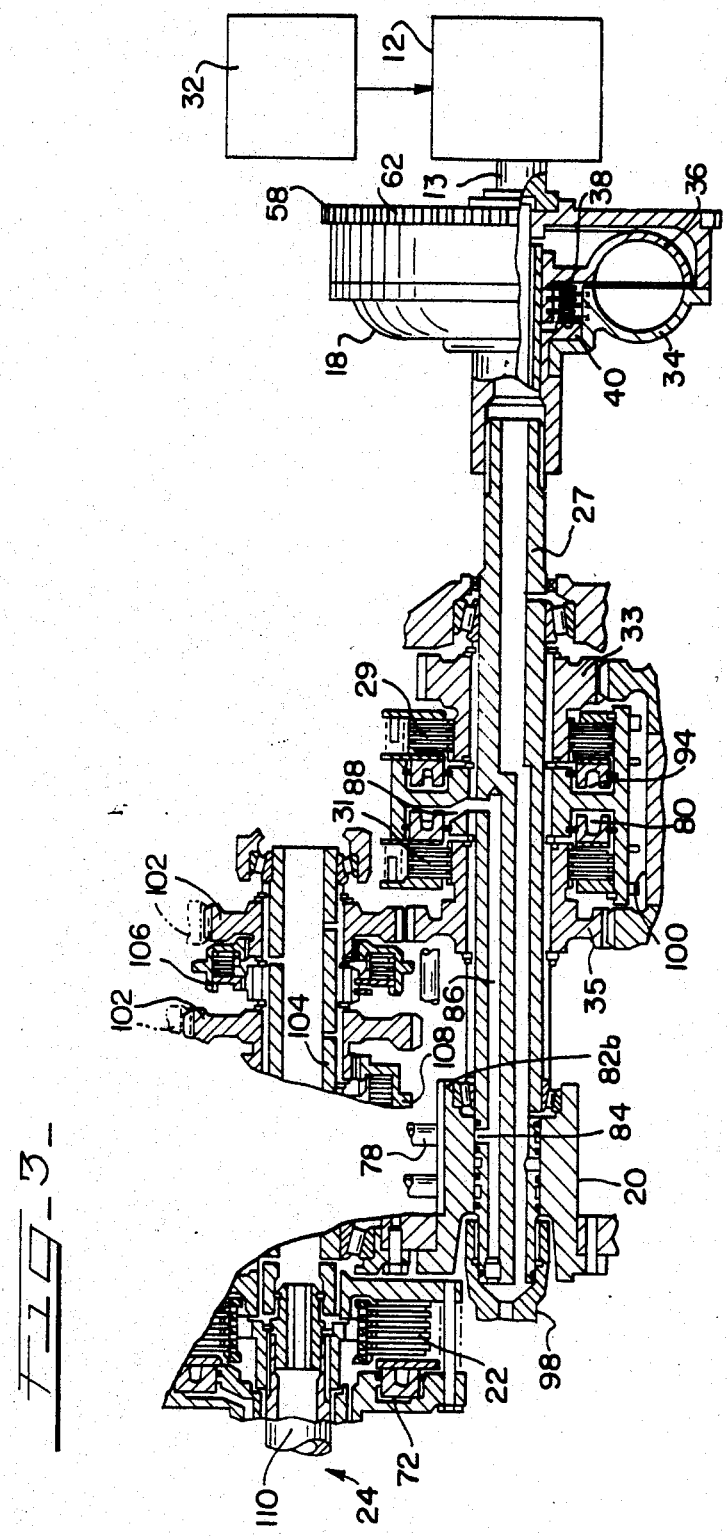

COMPOSITE DRIVE FOR A TRACTOR INCLUDING A FLUID COUPLING ASSEMBLY WITH A LOCKUP CLUTCH

This is a continuation-in-part application of a continuation-in-part application Ser. No. 423,893 filed on Sept. 27, 1982, now U.S. Pat. No. 4,526,255 which is a continuation-in-part application Ser. No. 240,040, filed on Mar. 3, 1981 now abandoned.

BACKGROUND OF THE INVENTION

Field of the Invention

This invention relates generally to rotary power transmission systems, and more particularly to tractor transmissions utilizing a fluid coupling with a lock-up clutch.

Tractors employing a transmission that is directly coupled to the engine are difficult to control at low speed. Also, such arrangement requires that the master clutch between range and speed transmissions be slipped when the tractor is moved slowly. Such clutch slipping results in wear and deterioration of the master clutch, and also in a bucking of the tractor. This bucking is not only unpleasant to the operator, but can be quite dangerous in many situations. For example, when a tractor is being hitched to a farm implement or trailer, an unfortunate buck of the tractor might give a discomfitting jolt to a person holding the hitch of the tractor in alignment with the hitch of the implement.

A fluid coupling has a certain amount of slip which reduces the tendency of a tractor to buck and improves low speed control. However, such fluid slip reduces the fuel efficiency of the tractor. Thus, the design of the fluid coupling requires a trade-off between low speed operation and fuel efficiency, with greater slip favoring low speed operation at the expense of fuel efficiency and vice versa. The novel structure and function of elements thereof utilizing a master clutch, speed transmission and high-slip fluid coupling with a lock-up clutch being described hereinbelow represents a significant departure from the prior art.

DESCRIPTION OF THE DRAWINGS

FIG. 1 is a block diagram of a transmission system embodying the principles according to our invention;

FIG. 2 is a partially cross-sectional top view of a composite transmission power train including a power-shift speed transmission; and FIG. 3 is a partially cross-sectional top view of the power-shift speed transmission.

SUMMARY OF THE INVENTION

The present invention comprises a composite drivetrain arrangement for a tractor or like implement. In the preferred form, the drivetrain includes a range transmission for providing a plurality of speed ranges, and a speed transmission for providing a plurality of speeds by selective actuation of power shift clutches. A master clutch selectively operatively connects the output of the speed transmission with the input of the range transmission.

The arrangement further includes a fluid coupling assembly which operatively connects an engine output shaft of the implement with the input to the speed transmission. The fluid coupling assembly includes fluid torque transfer means, and a lockup clutch for locking the fluid torque transfer means whereby torque transfer in the assembly is via the lockup clutch within predetermined speed limits of the engine output shaft.

Actuation of the lockup clutch is coordinated with actuation of the master clutch, whereby disengagement of the master clutch effects disengagement of the lockup clutch, with engagement of the lockup clutch effected after engagement of the master clutch. By this arrangement, fluid torque transfer is effected by the fluid coupling assembly at relatively low speeds of the implement for enhanced control and smooth operation, with engagement of the lockup clutch at higher speeds desirably enhancing efficiency. The lockup clutch is configured for slippage in the event of excessive loading of the drivetrain, with the fluid torque transfer means of the fluid coupling assembly assuming torque transfer.

DETAILED DESCRIPTION OF A PREFERRED EMBODIMENT

Referring now to FIG. 1, there is shown a block diagram of the transmission system according to the present invention, generally designated by the reference numeral 10. The system illustrated in FIG. 1 transfers power produced by an engine 12 to a set of driving wheels 14 and 16 via a fluid coupling 18, a speed transmission 20 having an input shaft 27 connected to the coupling 18, a master clutch 22, a second or range transmission 24, which in a preferred embodiment is a multiple ratio gear transmission, and a differential 26. It must be understood that the speed transmission 20 can be of either a hydromechanical or mechanical type. The power shift speed transmission 20 shown in FIG. 1 only illustrates the preferred embodiment. The master clutch 22 is shown interposed between the speed transmission 20 and the multiple ratio transmission gear box 24. A speed and range selector 30, which may be a hand movable lever, a pedal, or a combination of the two is used to select the desired range in the multiple ratio gear transmission 24 and to control the speed of the engine 12, preferably by means of an engine speed control 32, which may be a governor or the like.

In accordance with an important aspect of the present invention, the fluid coupling 18 contains an impeller or pump 34 and an output turbine 36 selectively locked together by a lockup clutch 38. The lockup clutch 38 is engaged and disengaged by a clutch actuator 40, which is preferably a hydraulic clutch piston activated by a vehicle hydraulic pressure source 42 under the control of a solenoid valve 44. A valve 44a, located on a hydraulic line 44b by-passing the fluid flow through the solenoid valve 44, is interconnected with its manual control 44c. The control 44c, which may comprise a pedal or switch, is designated for a manual flow interruption and subsequent disengagement of the lockup clutch 38 whenever a vehicle operator deems it necessary. A power take off (not shown) may also be provided to drive auxiliary equipment. However, such a power take off would normally be coupled to the engine 12 ahead of the fluid coupling 18, and thus not be affected by the operation of the fluid coupling 18 or the lockup clutch 38.

Although the above-described system is applicable to many systems that require rotary power to be efficiently transmitted from one point to another, the system according to the invention is particularly suitable for tractor applications. Thus, the system will be described in a farm tractor environment, and its advantages will be particularly apparent.

In operation to drive the tractor, the master clutch 22 is used to interrupt the power transmission path between the engine 12 and the driving wheels 14 and 16. The speed and range selector 30 is used to select the desired range in the range transmission 24 and to control engine speed. The master clutch 22 is then engaged to permit power to be transferred between the engine 12 and the wheels 14 and 16, thus permitting the tractor to move.

As the tractor begins to move, the lockup clutch 38 is maintained in a disengaged position, thereby permitting slip between the impeller 34 and the driven turbine 36 of the fluid coupling 18. This permits the tractor to start smoothly and permits the speed of the tractor to be easily and accurately controlled. Because of the nature of a fluid coupling, which can transmit only a limited amount of torque at low speed, the operator can easily control the speed of the tractor simply by utilizing the brake petal (not shown) to retard the movement of the wheels 14 and 16.

Once the tractor is moving, and the speed of the engine is increased, the amount of torque transmitted by the fluid coupling increases, thereby permitting the tractor to be brought up quickly to speed but smoothly. However, once operating speed is reached, it is undesirable to permit relative motion between the impeller 34 and turbine 36 of the fluid coupling 18, since such relative motion wastes energy which must be dissipated as heat by the fluid coupling 18, and also results in an increase in fuel consumption by the engine 12. Within predetermined upper and lower engine speed limits the lockup clutch 38 engages and assumes torque transfer function of the coupling 18.

Once the lockup clutch 38 engages, it is desirable to maintain the clutch engaged if the speed of the engine 12 should drop below the speed at which the clutch 38 was orginally engaged. This is desirable for two reasons. Firstly, it reduces the number of times that the clutch 38 must be engaged and disengaged as the speed of the engine 12 varies about the engagement point, and thus reduces wear of the clutch 38. Secondly, because of the nature of operation of a vehicle such as a tractor, the speed of the engine 12 may slow down when a higher load is placed on the tractor. Under such conditions, it is desirable to maintain the impeller 34 and the turbine 36 locked to provide maximum transfer of torque through the system. Thus, once the lockup clutch 38 has been engaged, it is maintained engaged until the speed of the engine 12 drops substantially below the speed at which the clutch 38 was orginally engaged. Typically, for tractor operations, the lockup clutch 38 is orginally engaged once the speed of the engine 12 exceeds a higher transition speed of approximately 1400 rpm, and disengaged when the speed of the engine 12 drops below a lower transition speed of approximately 1000 rpm; however, these transition speeds will vary depending on the particular engine and vehicle used, and the intended applications of that vehicle.

The deliberately designed-in, unique high-slip drive condition afforded by our invention means that the driver experiences a driver-clutchless power upshift operation, in effect adding a new dimension to a transmission operation in general and to an automatic transmission operation in particular. In other words, the substantial difference in ground speed under the two conditions produces a manifest speed-up as an actual shift in gears.

Once the speed of the engine 12 drops below the lower transition speed, the solenoid valve 44 closes, thus blocking hydraulic pressure of the hydraulic pressure source 42 from the clutch actuator 40. The hydraulic pressure on the clutch actuator piston 40 is relieved and a rapid disengagement of the lockup clutch 38 follows immediately thereafter. The lockup clutch 38 will remain locked until the rpm eventually drop below approximately the 1000 rpm providing sustained engine braking. After dropping below the lower disengagement speed the vehicle may be conveniently brought to a halt with only the service brakes and without stalling the engine.

The lockup clutch 38 slips during periods of an engine overload, thereby shifting an engine power output transfer task to the fluid coupling 18. This would increase torque transfer to the speed transmission. The high slip of the fluid coupling permits absorbtion of an abrupt speed differential existing during a start-up operation of the tractor until the coupling brings the vehicle speed to a level corresponding to a selected gear setting. Also, the coupling 18 being completely engaged during a slip lockout mode of operation provides an automatic slippage during a temporary engine overload. This would automatically maintain nearly full engine speed, regardless of the terrain conditions and tractor speed.

When the range transmission control is in reverse, the lockup clutch 38 will be unengageable and the fluid coupling 18 will have the capability of slipping whenever the tractor vehicle is in reverse. This is especially desirable when hitching up implements behind the tractor, such as connecting a disk harrow to the tractor drawbar. The tractor will be in reverse and the fluid coupling will be utilized but with no lockup. Thus, even if the engine rpm exceed the lockup transition speed, the lockup clutch 38 of the fluid coupling 18 will not be engaged.

Because the fluid coupling 18 is locked when the tractor is operating at normal operating speed, and thus does not introduce any inefficiencies into the system under this condition, the compromise between operating efficiency and low speed controllability is avoided. Consequently, a fluid coupling having an inordinately large amount of slip, for example, on the order of at least approximately 10 percent, at rated load and speed (e.g., 2,400 rpm), is necessarily employed to enhance low speed controllability without degrading operating efficiency. This is a contrast in kind to a system without a lockup clutch in which the slip typically cannot exceed 3 percent without excessively degrading efficiency.

Torque converters, the distinctive alternative, fall critically short of the coupling's unique parabolic performance curve (torque proportional to square of engine speed).

A valve 44a is located on a hydraulic line 44b interconnecting the hydraulic pressure source 42 with the clutch actuator piston 40 and by-passing the solenoid valve 44. The valve 44a, being operatively interconnected with and actuated by a pedal or other kind of a control mechanism, can regulate the flow of fluid to the lockup clutch 38, regardless of a speed related control of the clutch 38. Thus, an operator can manually disengage the lockup clutch 38, i.e. by pressing the pedal 44c, at will, thereby increasing the torque transfer to the speed transmission 20 via the fluid coupling 18. This can be helpful in emergency and swampy or viscid soil condition.

Further in the illustrated embodiment, the speed transmission 20 can be of the hydromechanical design which is disclosed and claimed in the co-assigned application Ser. No. 240,040 and which, for each fixed speed reduction ration as selected by the step-ratio engaged gearing in the speed transmission, affords hydromechanically provided infinitely variable speed characteristics within a limited range while fixed at that ratio.

Our transmission system is additionally well adapted to a power-shifted speed transmission arrangement, 10a as illustrated in FIG. 2. The engine 12 has a crankshaft 13 which is provided with a fluid drive connection via the coupling 18 to the shaft 27 at the input end of the speed transmission 20. Respective low 29 and high 31 power shift clutch packs selectively connect the input shaft to a low speed drive gear 33 for torque amplification in the speed transmission or to a high speed drive gear 35. The difference in the speeds accorded thereby at the front end of the speed transmission 20 in the illustrated invention was about 17 percent depending upon which of the clutches 29 (Low) or 31 (High) was selected.

Referring now to FIG. 3, wherein the hydraulic clutch cylinder 72 is shown and designated for actuation of the master clutch 22. Hydraulic fluid moves through service line 78 into a path to the clutch cylinder 80 of the high clutch 31. More particularly, a manifold cover appearing in this figure at 82b falls in the path leading from the service line 78 and through the passages 84 and 86 in the speed transmission input shaft 27, thence through a radial passage 88 into the high clutch cylinder 80 as mentioned.

Similar passages in the manifold cover 82b and input shaft 27 complete the complementary path into the clutch cylinder 94 for the low clutch 29.

The speed transmission input shaft 27 is used to provide a straight-through drive to the shaft 98 of an independent power take off, not shown. And through an appropriate mesh with complementary pinions on a countershaft 100 journalled in the speed transmission 20, the selected low speed and high speed drive gears 33 and 35 are able, through conventional intermediate gearing 102 on the countershaft 100 and the speed transmission output shaft 104, to in effect double the power paths which are available. For this purpose two blocker type synchronizer collars 106 and 108 afford either a 1-2 speed, a 3-4 speed, or a 5-6 speed of the shaft 104. The shift between the 1 and 2 speeds is implemented by power from the clutches 29 and 31, the shift between 3 and 4 speeds similarly by power shift, and the shift between 5 and 6 speeds is similarily by power shift.

The master clutch 22 transmits, to the input shaft 110 of the range transmission 24, having at least three ranges, any one of the just mentioned six speeds of the speed transmission output shaft 104, and the rotation continues in the range transmission 24 through its high range, medium range, or low range paths, or through reverse.

If a tractor encounters a higher temporary or sustained load or resistance he can immediately obtain on-the-go torque amplification, without foot clutching, by power shifting to the torque amplifier low clutch 29. When the speed of the tractor builds back up as the high resistance area is passed by the tractor, the operator will immediately, again on-the-go, power shift back to the high clutch 31 and restore the higher speed operation.

The power shift clutches are engaged before the master clutch. The fluid coupling lockup clutch 38 engages after the master clutch complete engagement.

The power shift speed clutches disengage whenever the master clutch is disengaged. The speed transmission, at both ends thereof, will therefore be simultaneously disconnected from the engine and range transmission inertias for easier synchronizations during speed transmission shifts, with appreciably less delay by, and wear upon, the mechanical synchronizers therein.

Power train reengagement for on-the-road operations, required after placing the range transmission into a more appropriate higher setting, allows the master clutch to start with, for example, as high as a 25% slip being reached for the moment in the slip drive. The first power shift power shifting the high (HI) clutch 31, occurs with lockout of the fluid slip drive to a 1:1 upshift speed ratio by engagement of the lockup clutch 38.

The second power upshift obviously transpires with the operator changing the clutch setting to the high speed power shift 31.

While one embodiment of the invention has been illustrated and described herein, various changes and modifications may be made therein without departing from the spirit of the invention as defined by the scope of the appended claims.

What is claimed is:

1. A composite drive for an implement such as a tractor having an engine output shaft, comprising:
    a range transmission including means for providing a plurality of speed ranges;
    a speed transmission comprising means for providing a plurality of speeds including a series of alternately actuated shift clutch means;
    master clutch means operable to selectively operably connect an output shaft of said speed transmission with an input shaft of said range transmission whereby said speed transmission drives said range transmission; and
    fluid coupling means for operably connecting said engine output shaft with said speed transmission whereby said engine output shaft drives said speed transmission, said fluid coupling means including lockup clutch means operable within predetermined speed limits of said engine output shaft to transfer torque through said fluid coupling means, said fluid coupling means further including fluid torque transfer means for transmitting torque when said lockup clutch means is disengaged;
    said lockup clutch means being disengageable attendant to disengagement of said master clutch means, and said lockup clutch means being engageable subsequent to engagement of said master clutch means, with said fluid torque transfer means effecting torque transfer from said engine output shaft when said lockup clutch means is disengaged.

2. A composite drivetrain for an implement such as a tractor having an engine output shaft, comprising:
    a high-slip fluid coupling assembly connected with said engine output shaft and including fluid torque transfer means, and lockup clutch means configured for automatic engagement and disengagement under predetermined operating conditions of said implement, said lockup clutch means functioning to transfer torque through said fluid coupling assembly when said lockup clutch means is engaged; and a speed transmission coupled with and driven by said fluid coupling assembly, said speed transmission comprising a series of alternately actuated power shift clutch means providing different speed ratio modes for said speed transmission, said lockup clutch means being engaged at a predetermined speed of said engine output shaft during an increase in speed of said engine output shaft whereby torque transfer through said fluid coupling assembly is via said fluid torque transfer means until said predetermined speed is reached for facilitating smooth delivery of power to said speed transmission, said lockup clutch means being configured for limited slippage during engagement thereof when said drivetrain is temporarily subjected to excessive loading.

3. The composite drivetrain in accordance with claim 2, including a range transmission driven by said speed transmission via selectively engageable master clutch means, said lockup clutch means being engageable sequentially after engagement of one of said power shift clutch means and engagement of said master clutch means.

4. The composite drivetrain in accordance with claim 2, wherein said lockup clutch means in configured for automatic engagement at said predetermined speed of said engine output shaft, said lockup clutch means being configured for automatic disengagement at another predetermined engine output shaft speed less than the first-said predetermined speed.

5. A composite drivetrain for an implement having an engine output shaft, comprising:

a range transmission including means for providing a plurality of speed ranges;

a speed transmission comprising means for providing a plurality of speeds including a series of alternatively acutated power shift clutch means;

master clutch means operable to selectively operatively connect said speed transmission in driving relation with said range transmission;

and a fluid coupling assembly including fluid torque transfer means, and lockup clutch means operable for transferring torque through said fluid coupling assembly under predetermined operating conditions, said lockup clutch means being configured for engagement for torque transfer subsequent to engagement of said master clutch means following engagement of one of said power shift clutch means.

6. The composite drivetrain in accordance with claim 5, including means operable by an operator of said implement for selectively disengaging said lockup clutch means.

7. The composite drivetrain in accordance with claim 5, including means whereby disengagement of said master clutch means effects synchronous disengagement of said lockup clutch means and said power shift clutch means.

8. A power shifted composite drive to transmit multiple speeds from an engine output shaft, comprising:

a speed transmission having an input shaft, an output shaft, and a plurality of intervening speed ratio means comprising power shift clutch means; and friction slip fluid coupling means comprising first lockup clutch means for connecting said engine output shaft and said speed transmission input shaft for drive therebetween, said lockup clutch means being operative in a first condition of operation to frictionally prevent relative motion between said engine output shaft and said transmission input shaft under ordinary load, said lockup clutch means being responsive to torque carried thereby and operative in a second condition of operation to frictionally slip to permit relative motion between said engine output shaft and said transmission input shaft under temporary overload beyond said ordinary load;

said friction slip fluid coupling means further comprising a fluid coupled impeller and output turbine coupling to limit the relative motion afforded during said friction slip second condition of operation.

9. The composite drivetrain in accordance with claim 8, including means for disengaging said lockup clutch means to a third fully released condition when the speed of said engine output shaft reduces to below a predetermined value.

* * * * *